P. J. PAQUET.
GLASS DRAWING APPARATUS.
APPLICATION FILED MAY 1, 1914.
1,144,234.
Patented June 22, 1915.
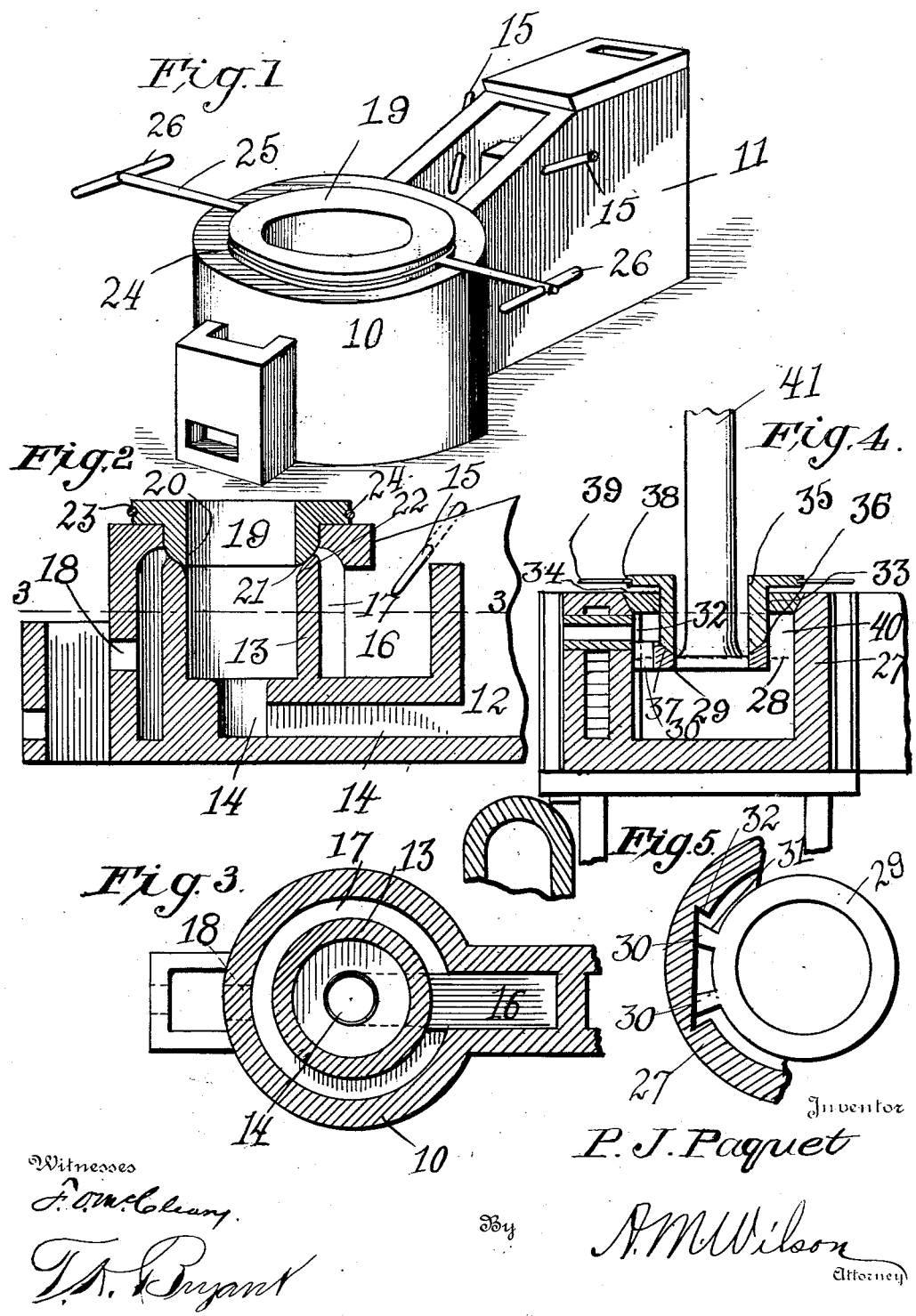
Witnesses
F. O. McCleary
T. K. Bryant
Inventor
P. J. Paquet
By N. M. Wilson
Attorney

UNITED STATES PATENT OFFICE.

PIERRE JOSEPH PAQUET, OF SALEM, WEST VIRGINIA.

GLASS-DRAWING APPARATUS.

1,144,234.   Specification of Letters Patent.   Patented June 22, 1915.

Application filed May 1, 1914. Serial No. 835,631.

*To all whom it may concern:*

Be it known that I, PIERRE JOSEPH PAQUET, a citizen of the United States, and residing at Salem, in the county of Harrison and State of West Virginia, have invented certain new and useful Improvements in Glass-Drawing Apparatus, of which the following is a specification.

This invention relates to certain new and useful improvements in glass drawing apparatus.

The primary object of this invention is to provide a means either in connection with a drawing pot or a gathering ring, whereby the furnace heat may be fed into contact with the glass whenever desired.

It being necessary to soften the glass for the purpose of drawing and finishing a cylinder, the present invention is designed to allow the entrance of the furnace heat directly upon the surface of the glass as well as upon the cylinder at a point adjacent the surface of the glass when the cylinder is being drawn and whereby the cylinder may be readily drawn to a point or may be ended, the heat being deflected toward the surface of the glass entirely around the cylinder. In performing these functions, a vertically movable ring is designed for employment either with the top edge of the drawing pot or with the upper edge of a gathering ring, when such ring is employed while in each instance, an upward movement of the ring admits the furnace heat entirely circumferentially thereof and directed downwardly upon the surface of the inclosed drawing glass.

The invention therefore consists in the novel combination and arrangement of parts hereinafter described, illustrated in the accompanying drawings, and pointed out in the appended claims.

In the drawings forming a part of this application and wherein like designating numerals refer to corresponding parts throughout the several views: Figure 1 is a perspective view of an out-working furnace with the present invention and also showing the glass tank connecting portion. Fig. 2 is a central longitudinal sectional view thereof partially broken away. Fig. 3 is a horizontal sectional view taken upon line 3—3 of Fig. 2. Fig. 4 is a vertical sectional view showing the device employed in connection with a gathering ring within a glass pot and showing a portion of a cylinder in the drawing operation, and, Fig. 5 is a horizontal sectional detail view of the engagement between the gathering ring and glass pot wall.

Referring more in detail to the drawings, the present heat controlling ring is illustrated in Figs. 1, 2, and 3 employed in connection with an out-working furnace 10 attached to the end of a glass tank 11 and whereby the glass from the tank 12 enters the drawing pot 13 through the bottom passage 14. Converging burner nozzles 15 are provided in the combustion chamber 16 and whereby upon ignition, the combustion mixture entirely fills the annular chamber 17 and thereby inclosing the drawing pot 13 while an outlet vent 18 is provided. A damper ring 19 is provided with a depending annular flange 20 having a beveled edge 21 seated within the top of the drawing pot 13 and upon the inwardly inclined edge 22 at the top of said pot, and whereby the combustion flame or heat is prevented from entering the drawing pot while said ring is in its seated position. The peripheral groove 23 is provided around the ring 19 for the purpose of engagement with an elevating means herein illustrated as formed of an encircling ring 24 fitting the groove 23 and having oppositely-projecting arms 25 terminating in cross handles 26 and the ring 19 may be elevated off of its seat upon the drawing pot whenever desired and again reseated.

In Figs. 4 and 5 of the drawings, the application of the invention is illustrated in connection with that class of glass furnaces in which gathering rings are employed which float upon the surface of the molten glass. In these views, the furnace casing 27 is provided with the molten glass to a height indicated by the dotted line 28, the furnace being substantially of that form illustrated in my former Patent #1,000,546. A gathering ring 29 is shown within the molten glass and provided with projecting feet 30 having outward diverging faces 31 freely positioned within a vertical groove 32 in the inner face of the furnace casing and whereby the gathering ring is positioned beneath the opening 33 in the cover plate 34, while the ring is free to move vertically upon any change in the level of the molten glass. A damper ring 35 is positioned vertically movable through the plate opening 33 and has a slanting bottom surface 36 adapted to seat upon the inwardly converging upper face 37 of the gathering ring. The damper ring is provided with a circumferential groove 38 for engaging an elevating means 39 similar to that illustrated in Fig. 1, and whereby the damper ring 35 may readily be elevated above the gathering ring 29 and again deposited thereon at will. In this form of furnace it is to be understood that the combustible gases are inclosed in the surrounding chamber 40 which encircles the ring 35 and the upper portion of the gathering ring 29 above the surface of the molten glass.

The operation of the damper ring in connection with both forms of glass drawing apparatus is identical, in that by elevating the damper ring, the surrounding heating medium is allowed to enter and contact the surface of the inclosed glass portion from which the cylinder is being drawn and the inwardly inclined annular edges of the members so separated downwardly direct the flame or heat upon such glass surface and also upon the lower end of the glass cylinder. The lower portion of a cylinder 41 is illustrated in Fig. 4 as being drawn from the glass within the gathering ring 29 through the damper ring 35 furnishing upon separation an annular space between the thus separated faces 36 and 37, allowing an entrance of the heating flame from the chamber 40 to a point interiorly of the gathering ring and in contact with the said cylinder. The cylinder and adjacent glass being thus raised in temperature and consequently softened, allows the said cylinder end to be molded or tapered and finished in the manner that may be desirable.

While the forms of the invention herein shown and described are what are believed to be preferable embodiments thereof, it is nevertheless to be understood that various forms and modifications may be resorted to which fall within the spirit and scope of the invention as claimed.

What I claim as new is:—

1. In combination with a glass furnace casing having a vertical dove-tailed slot in its inner face, a gathering ring adapted for floating upon the molten glass within said pot and having an inwardly-inclined upper face, projecting feet upon said ring having outwardly-diverging faces slidably positioned within said slot, the wider ends of said feet being movable into and out of said dove-tailed slot, a perforated plate upon said furnace casing, a damper ring provided with a depending flange slidably-positioned through the perforation of said plate and also having an inwardly-inclined lower face adapted for seating upon the upper face of said gathering ring, the said furnace casing provided with an annular heating chamber surrounding the upper portion of said gathering ring and the lower portion of said damper ring flange when said flange and gathering ring are in engagement with each other, and elevating means for said damper ring.

2. In combination with a glass furnace casing having a chamber adapted for holding molten glass, and said chamber having a vertical slot with inwardly-converging sides, a gathering ring within the molten glass of said chamber, outwardly-projecting feet upon said ring and provided with outwardly-flaring opposite faces adapted for sliding reception within the said slot and movable into and out of the slot, and a damper ring mounted upon said gathering ring.

In testimony whereof I affix my signature in presence of two witnesses.

PIERRE JOSEPH PAQUET.

Witnesses:
 ELMER E. SHIRA,
 HOWARD W. FERRER.